June 3, 1969 C. L. SCHWANINGER 3,448,296

APPARATUS FOR STRETCHING PULSES EXCEEDING PREDETERMINED AMPLITUDE

Filed Dec. 8, 1966

INVENTOR

CLAUDE L. SCHWANINGER

BY Arnold & Roylance

ATTORNEYS

United States Patent Office 3,448,296

Patented June 3, 1969

3,448,296

APPARATUS FOR STRETCHING PULSES EXCEEDING PREDETERMINED AMPLITUDE

Claude L. Schwaninger, Houston, Tex., assignor to American Machine & Foundry Company, New York, N.Y., a corporation of New Jersey Filed Dec. 8, 1966, Ser. No. 600,199
Int. Cl. H03k 1/14, 5/04, 5/20
U.S. Cl. 307—267 7 Claims

ABSTRACT OF THE DISCLOSURE

This application discloses a pulse stretching apparatus including a capacitor; a charging circuit for the capacitor including two transistors connected in emitter-follower configuration; a timing circuit; and a switchable discharge circuit comprising the emitter-collector circuit of another transistor. Input pulses of short duration are applied through the charging circuit to the capacitor and to the timing circuit. The timing circuit opens the discharge path for a predetermined time in response to each input pulse, allowing the capacitor to accumulate a charge. At the end of the predetermined time the discharge path is restored, discharging the capacitor. The output signal is the capacitor voltage. In a second embodiment, a comparator circuit precedes the timing circuit, preventing the timing circuit from responding to input pulses the amplitudes of which are less than a predetermined voltage level.

This invention relates to pulse shaping apparatus, and more specifically to apparatus for accepting an input pulse of relatively short time duration and producing therefrom a pulse of predetermined longer duration.

In various fields of technology it is frequently necessary to determine the existence of a pulse the duration of which is extremely short, or of a plurality of such pulses. In an apparatus which is designed to record or display such pulses, superior and more dependable operation can be obtained if the pulses are lengthened, or stretched, in time.

An object of the present invention is to provide apparatus for accepting a pulse of relatively short duration and producing therefrom a pulse of predetermined longer duration.

Another object is to provide a simple and reliable apparatus for accepting a plurality of short duration input pulses of different amplitudes and for producing a like plurality of output pulses each having a predetermined constant longer duration, the amplitudes of the output pulses being proportional to the amplitudes of the input pulses.

Yet another object is to provide an apparatus for accepting a plurality of input pulses, rejecting all pulses the amplitudes of which are less than a preselected amplitude level, and increasing the time duration of those input pulses the amplitudes of which exceed the preselected level.

In its broader aspects, the invention includes transistor circuit means for directing the energy of a pulse to a capacitor to place a charge on the capacitor. Because the input pulse is relatively short in duration, the energy accumulated is proportional to the pulse amplitude. The input pulse is also used to initiate a timing device which changes state and places a transistor clamp circuit in a nonconductive state. The clamp circuit is connected across the capacitor so that the capacitor is allowed to accumulate a charge during the time the clamp is nonconductive, but then is rapidly discharged when the timing device, and thus the clamp circuit, return to their normal or quiescent states. Charging the capacitor initiates an output pulse, and discharging the capacitor terminates it.

In order that the manner in which the foregoing and other objects are attained in accordance with the invention can be understood in detail, reference is made to the accompanying drawings, which form a part of this specification, and wherein.

Figure 1:
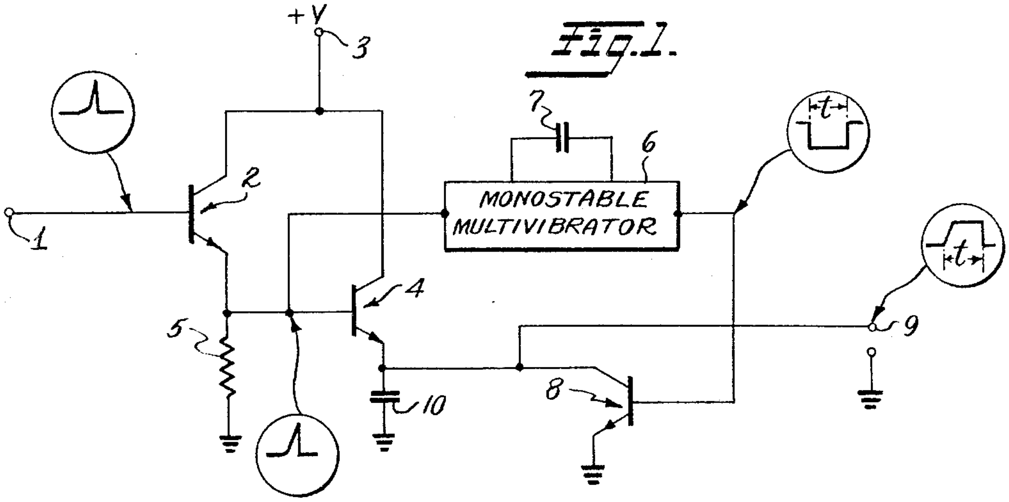
FIG. 1 is a schematic diagram of a pulse stretching apparatus in accordance with one embodiment of the invention.

Referring now to FIG. 1, it will be seen that the pulse stretching apparatus shown therein includes a signal input terminal 1 which is connected to the base electrode of a conventional NPN transistor 2. The collector electrode of transistor 2 is connected to a DC terminal 3 which, in operation, is connected to a source of positive DC voltage of suitable magnitude for the transistors selected for this circuit. The emitter electrode of transistor 2 is connected through a bias resistor 5 to a point of reference potential, shown in FIG. 1 as ground. The emitter electrode is also connected to the base electrode of a conventional NPN transistor 4 and to the input terminal of a timing circuit means shown in FIG. 1 as a monostable multivibrator circuit 6. As will be described in greater detail below, multivibrator circuit 6 includes a timing capacitor 7 which determines the duration of the timing signals developed. The output of multivibrator circuit 6 is connected to the base electrode of a conventional NPN transistor 8, the emitter electrode of transistor 8 being connected to ground and the collector electrode being connected to the emitter electrode of transistor 4. The collector electrode of transistor 8 is also connected to an output terminal 9 and to one terminal of a capacitor 10 the other terminal of which is connected to ground. The collector electrode of transistor 4 is connected to DC source terminal 3.

The operation of the circuit of FIG. 1 will be explained with reference to the wave form diagrams shown adjacent various points in the circuit. The circuit is intended to resopnd to pulses having relatively unpredictable amplitudes and of relatively short time duration as shown by the wave form at the base electrode of transistor 2.

It will be recognized that this wave form diagram is illustrative and that the circuit can be employed to accept pulses of other forms, the primary characteristic being relatively short duration. With transistor 2 connected in emitter-follower fashion with resistor 5 providing the necessary bias for the emitter electrode, the interconnected combination of transistors 2 and 4 forms a charging circuit for capacitor 10. A positive pulse applied to the base of transistor 2 causes that transistor to conduct, raising the potential at its emitter electrode and therefore at the base electrode of transistor 4 so as to cause transistor 4 to also conduct. The current flow through the emitter-collector circuit of transistor 4 during the life of the input pulse places a charge on capacitor 10. The magnitude of this charge is dependent upon the degree of conductivity of transistor 4, which is, in turn, dependent upon the degree of conductivity of transistor 2 and the magnitude of the current flow through the circuit including resistor 5 and the emitter-collector circuit of transistor 2. The degree of conductivity of transistor 2, as will be recognized by one skilled in the art, is dependent upon the amplitude of the pulse applied at signal input terminal 1. Thus, the amount of charge accumulated by capacitor 10 is a function of the amplitude of the input pulse.

Figure 2:
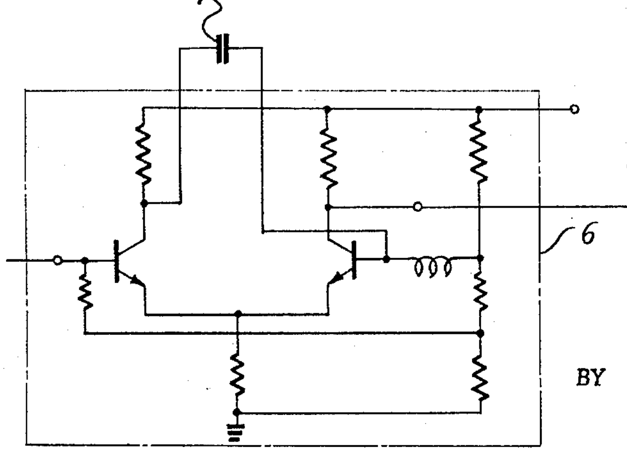
FIG. 2 is a schematic diagram of a conventional monostable multivibrator circuit usable in the embodiment of FIG. 1.

The input pulse, in the same form as it appears at the base electrode of transistor 4, is also applied to the timing circuit means comprising monostable multivibrator 6. As will be recognized by one skilled in the art, multivibrator 6 is characterized by a stable state and a temporarily or quasistable state. When supplied with an input pulse of appropriate polarity, multivibrator 6 converts from its stable state to its quasistable state and remains in the quasistable state for a predetermined period of time at the end of which the circuit returns to its stable state. Multivibrator 6 can be a conventional circuit, one suitable example being shown in FIG. 2. The circuit of FIG. 2 is similar to one shown and described in the General Electric Transistor Manual, 7th ed., 1964, at page 201, FIG. 7.20. In that circuit it will be seen that the length of time the circuit occupies its quasistable state, and therefore the duration of the output pulse, is determined primarily by the value of capacitor 7. The duration of this output pulse is shown in FIG. 1 at the waveform at the output of multivibrator 6 by the value *t*. It will be seen that this pulse is a negative-going rectangular pulse, the voltage at that point being normally positive but dropping to a more negative level during the quasistable portion of the operation of multivibrator circuit 6.

This signal is applied directly to the base electrode of transistor 8. Transistor 8, being an NPN transistor, is rendered conductive when a positive potential is applied to its base electrode. Thus, it will be seen that, when multivibrator 6 is in its stable state, transistor 8 is conductive and transistor 8 will be rendered substantially nonconductive only during the time *t*. When transistor 8 is conductive, the ungrounded terminal of capacitor 10 is clamped to ground potential and the voltage appearing at output terminal 9 is at substantially ground potential.

However, when an input pulse is applied to multivibrator 6 and to transistor 4, transistor 4 is rendered conductive and transistor 8 is rendered nonconductive, thereby simultaneously removing the ground clamp from capacitor 10 and providing a charging circuit for that capacitor allowing the accumulation of charge by capacitor 10 for the duration of the input pulse. The voltage at the ungrounded terminal of capacitor 10 therefore increases to a voltage level determined by the amplitude of the input pulse. The capacitor retains its charge until the termination of the quasistable delay of multivibrator 6, at the end of which transistor 8 is rendered conductive and capactor 10 is quickly discharged through the emitter-collector circuit of transistor 8. The resulting waveform is seen adjacent output terminal 9, the leading edge of the pulse having a noticeable rise time because of the charging time of the capacitor and the trailing edge having a relatively short fall time because of the low impedance of the discharge path through transistor 8. The amplitude of the output pulse at terminal 9 will be seen to be a function of the charge accumulated on capacitor 10 and therefore to the amplitude of the input pulse. The duration of the output pulse will, however, be determined solely by the time constant of multivibrator 6.

Figure 3:
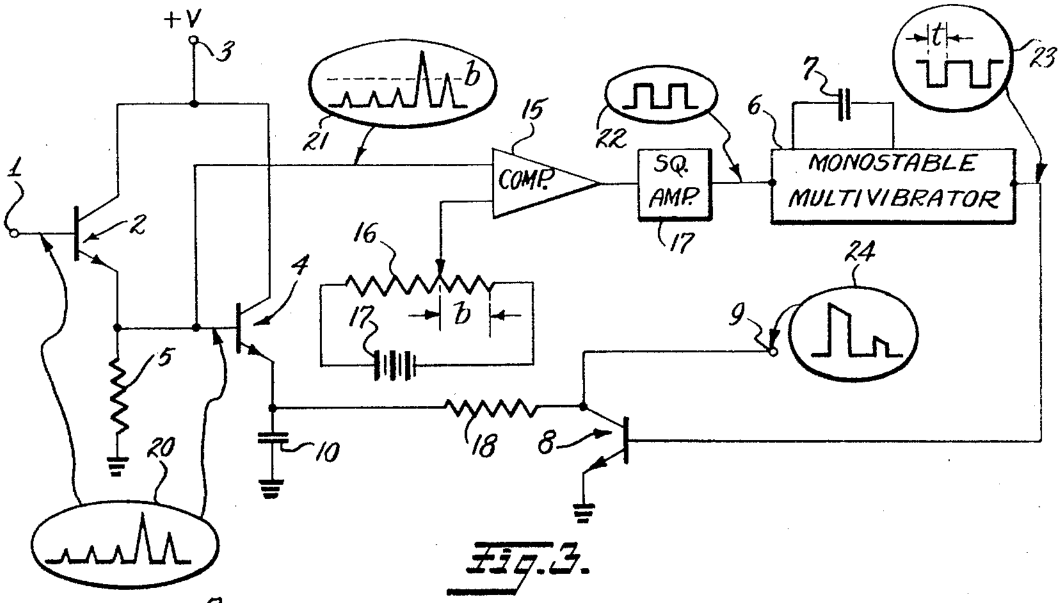
FIG. 3 is a schematic diagram, partly in block form, of a second embodiment of the invention.

FIG. 3 shows a second embodiment of the invention which includes a circuit means connected between the timing circuit means and the charging circuit means for delivering to the timing circuit means only those pulses the amplitudes of which exceed a preselected voltage level. Those elements of FIG. 3 which are the same as those of FIG. 1 are identified by like reference numerals, including the signal input terminal 1; the charging circuit means including transistors 2 and 4 and resistor 5; capacitor 10; the switchable discharge path including transistor 8, the timing circuit means including monostable multivibrator 6 and its timing capacitor 7; output terminal 9; and DC source terminal 3.

In addition, the circuit of FIG. 3 includes a voltage comparator circuit 15, one input terminal of which is connected to the base electrode of transistor 4, and the other input terminal of which is connected to the movable element of a potentiometer 16. The two terminals of the resistor of potentiometer 16 are connected to the positive and negative terminals of a relatively constant source of DC voltage indicated in FIG. 3 as a battery 17. It will be recognized by one skilled in the art that the DC source connected to potentiometer 16 can be some form of battery, such as a standard cell, but that it can also be any conventional relatively constant source of DC voltage such as one of the many Zener diode-regulated electronic sources. Comparator circuit 15 is of a type which is capable of producing an output pulse only when a pulse applied to its input terminal exceeds a preselected value, in this case the preselected value being that established by the circuit including battery 17 and potentiometer 16. The output of comparator circuit 15 is connected to the input terminal of a squaring amplifier 17, which operates to decrease the rise time of pulses emanating from circuit 15. The output of squaring amplifier 17 is connected to monostable multivibrator 6 which was previously discussed with reference to FIG. 1.

The circuit of FIG. 3 also includes a resistor 18 which is connected between the ungrounded terminal of capacitor 10 and the collector electrode of transistor 8. Resistor 18 is included to prevent excessive current flow through transistors 4 and 8, thereby protecting those transistors against possible damage due to excessive current.

To illustrate the operation of the circuit of FIG. 3, a series of pulses is shown applied to input terminal 1 and to the base electrode of transistor 2, these pulses also appear at the base electrode of transistor 4 and to one input terminal of comparator circuit 15. As in the circuit of FIG. 1, transistor 8 is normally in a conductive state so that no charge can be accumulated on capacitor 10. With each of the first three pulses shown in waveform diagram 20, transistors 2 and 4 are rendered partially conductive, allowing current flow through those transistors to capacitor 10. The pulses are also applied to comparator circuit 15. The setting of the movable element of potentiometer 16 establishes a reference level in comparator circuit 15 indicated as level *b* in waveform diagram 21. Level *b* is the preselected level below which comparator circuit 15 will provide no output signals. Thus no signals are supplied to multivibrator 6 and no state change is made in transistor 8.

However, with the occurrence of the fourth pulse, shown in wave form diagrams 20 and 21, comparator circuit 15 will produce an output pulse because the amplitude of the fourth pulse exceeds the preselected level. The same is also true of the fifth pulse, thereby producing two pulses from comparator circuit 15 and squaring amplifier 17 as shown in waveform diagram 22. The monostable multivibrator 6 is therefore caused to enter its quasistable state for two distinct time periods, each of duration *t* in response to the fourth and fifth pulses, placing transistor 8 in its noncoductive state during each of these time periods. During each of these nonconductive states of transistor 8, capacitor 10 is allowed to accumulate a charge, raising the voltage level at the collector electrode of transistor 8 to the level of charge of capacitor 10, and then decreasing that voltage rapidly during the time in which multivibrator 6 returns to its stable state. Thus, two pulses are produced at output terminal 9, each of these pulses being representative of one of the input pulses, but having constant predetermined durations as established by the timing elements of multivibrator 6.

It will be noted in waveform diagram 24 at output terminal 9 that the two pulses are of differing amplitudes, as were pulses 4 and 5 in waveform diagrams 20 and 21. This occurs because, as described with reference to FIG. 1, capacitor 10 accumulates a charge which is proportional only to the amplitude of an input pulse. Because the input pulses are generally of very short duration, the amplitudes of the output pulses are substantially proportional to the amplitudes of the input pulses.

While certain advantageous embodiments have been chosen to illustrate the invention, it will be understood by those skilled in the art that various changes and modifications can be made therein without departing from the scope of the invention as defined in the appended claims.

I claim:

1. An apparatus for lengthening pulses of relatively short duration comprising the combination of:
 a capacitor;
 a discharge path coupled to one terminal of said capacitor and including switch means having a conductive state and a nonconductive state and a control terminal, the state of said discharge path being controlled by electrical signals applied to said control terminal;
 a signal input terminal to which pulses of relatively short duration can be applied;
 charging circuit means interconnecting said signal input terminal and said one terminal of said capacitor for providing an asymmetrically conductive charging path for said capacitor;
 timing circuit means having an input terminal and an output terminal for providing at said output terminal an electrical pulse of predetermined amplitude, polarity and duration in response to an electrical pulse applied to said input terminal,
  said output terminal of said timing circuit means being connected to said control terminal of said switch means;
 first circuit means including a comparator circuit means connected between said charging circuit means and said timing circuit means for providing to said input terminal of said timing circuit means all pulses applied to said signal input terminal the amplitudes of which exceed a preselected level; and
 an output terminal connected to said one terminal of the capacitor,
 said timing circuit means being operative to render said discharge path nonconductive when a pulse of sufficient amplitude is applied to said signal input terminal, and to render said discharge path conductive after a predetermined delay.

2. Apparatus according to claim 1 wherein said switch means comprises:
 a semiconductor electron valve having a control electrode and two other electrodes,
  said control electrode constituting said control terminal,
  said two other electrodes being connected to said one terminal of said capacitor and to a point of reference potential, respectively.

3. Apparatus according to claim 1 wherein said discharge path comprises:
 a resistor; and
 a transistor having a base electrode, a collector electrode and an emitter electrode,
  said emitter electrode being connected to a point of reference potential,
  said resistor being connected between said collector electrode and said one terminal of the capacitor, and
  said base electrode constituting said control terminal,
  said transistor being in a nonconductive state only during said delay predetermined by said timing circuit means.

4. Apparatus according to claim 1 wherein said timing circuit means comprises:
 a monostable multivibrator having a stable state and a quasistable state,
  said monostable multivibrator being responsive to an input pulse to change from said stable state to said quasistable state and to remain in said quasistable state for a predetermined time period.

5. Apparatus according to claim 1 wherein said charging circuit means comprises:
 a first transistor connected in emitter-follower circuit configuration,
  said first transistor having a base electrode connected to said signal input terminal and an emitter electrode; and
 a second circuit means interconnecting said emitter electrode and said one terminal of said capacitor.

6. Apparatus according to claim 5 wherein said second circuit means comprises:
 a second transistor having a base electrode connected to said emitter electrode of said first transistor and to said timing circuit means, and an emitter electrode connected to said one terminal of said capacitor.

7. Apparatus according to claim 1 wherein said first circuit means connected between said charging circuit means and said timing circuit means comprises:
 a source of constant D.C. voltage;
 said comparator circuit means having first and second input terminals and an output terminal coupled to said input terminal of said timing circuit means,
  said first input terminal being coupled to said charging circuit means to receive pulses applied to said signal input terminal,
  said second input terminal being connected to said source of DC voltage,
  said comparator circuit means being operative to provide to said timing circuit means all pulses supplied to said first input terminal the amplitudes of which exceed the preselected voltage level established at said second input terminal by said source of DC voltage.

References Cited

UNITED STATES PATENTS

| | | | |
|---|---|---|---|
| 2,572,080 | 10/1951 | Wallace | 328—58 |
| 2,688,697 | 9/1954 | Lawson et al. | 328—58 |
| 2,899,554 | 8/1959 | Rosen | 328—58 |
| 2,922,879 | 1/1960 | Vogt et al. | 328—58 |
| 3,296,458 | 1/1967 | Fracassi et al. | 328—115 XR |

ARTHUR GAUSS, *Primary Examiner.*

JOHN ZAZWORSKY, *Assistant Examiner.*

U.S. Cl. X.R.

307—235; 328—58, 115